Patented June 5, 1951

2,556,005

UNITED STATES PATENT OFFICE 2,556,005

PROCESS FOR THE PURIFICATION OF SAND HAVING A FERRUGINOUS COATING

Herbert Daymond Segrove, Thornton Heath, England, assignor to The Standard Brick and Sand Company Limited, Redhill, Surrey, England, a British company No Drawing. Application November 19, 1948, Serial No. 61,129. In Great Britain November 24, 1947

4 Claims. (Cl. 23—182)

This invention relates to a process for the decolorization of sand having a ferruginous coating.

Sand deposits available in certain areas have a coating of ferruginous material upon the individual grain which renders the sand unsuitable for use in glass manufacture. Attempts to purify the sand by known methods such as treatment with sodium hydrogen oxalate solution with or without other additions has only achieved a partial removal of the iron. Several treatments involving the use of reducing agents and mineral acids have also been proposed but a number of difficulties are encountered with these. The reducing agents involved are often expensive materials and unsuitable for use unless sand suitable for the production of optical glass is required. Others involve the use of hydrofluoric acid, a reagent which has always been notoriously difficult to handle.

It has, however, been found that treatment with caustic alkali followed by treatment with a mineral acid will enable the desired purification to be obtained under inexpensive operating conditions which are readily controlled.

According to the present invention a process for the decolorization of sand having a ferruginous coating comprises wetting the grains of sand with a caustic alkali solution, heating the wetted sand to substantial dryness and thereafter treating the sand with a mineral acid.

In accordance with a feature of the invention after heating, the sand is washed with water prior to treatment with mineral acid.

It appears that when sand coated with ferruginous material is heated with an aqueous solution of the caustic alkali the corresponding ferrite is formed, the following being the equation in the case of sodium hydroxide:

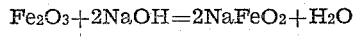
$$Fe_2O_3 + 2NaOH = 2NaFeO_2 + H_2O$$

This is a reversible reaction. Since excess of alkali favours the formation of ferrite it is preferred to use a substantial excess in the treatment. Also since the removal of water favours the formation of ferrite, the wetted sand is heated to such an extent as to drive off substantially all the water. The reaction appears to be completed when the temperature of the sand has reached 160° C. in the case of caustic soda and whilst a fairly wide range of temperatures can be used it is preferred not to heat too strongly.

Since these ferruginous sands carry a substantially uniform coating of iron the solution of the metal hydroxide employed should be used in sufficient amount to ensure the wetting of the surfaces of all the grains. Normally and preferably caustic soda in an amount equal to 1.5% of the weight of the sand is sufficient but in the case of very heavily coated sands 4–5% based on the weight of the sand may be desirable. Usually 50 ccs. of alkali for each kilogram of sand is sufficient.

After thorough mixing with the caustic soda solution the sand is heated with constant stirring until the reaction is complete. This is normally indicated by the fading of the yellow to red colour and usually occurs just before all the moisture has been driven off. The temperature is then about 150–160° C.

The hot sand is then preferably poured into water and the resulting slurry stirred. The sand is allowed to settle, the liquor removed and concentrated for use in the treatment of further quantities of sand.

The resulting sand, which is usually still quite yellow, is then poured into dilute sulphuric acid and thoroughly stirred. 2% by weight of sulphuric acid is usually suitable for this purpose. At this stage in the treatment the color disappears and a white sand product is obtained which can be finally purified by washing.

The treatment with water hydrolyses the ferrite formed during the treatment with alkali to regenerate ferric oxide which, however, is no longer firmly attached to the grains of sand. Most of it can be removed by washing with water and the remainder readily dissolves in cold dilute mineral acid.

The hydrolysis and acid treatment can be combined in a single stage by pouring the hot sand straight into dilute sulphuric or other mineral acid such as hydrochloric acid. However, this procedure has the disadvantage that the excess alkali used in the process is lost, since when a separate hydrolysis stage is used the aqueous liquor which contains the alkali employed in solution can be recovered and used again, after reconcentration if necessary.

The following table gives some typical results and compares the results with those obtainable with other processes in use at this time. The sand used had first had heavy minerals removed as far as possible by tabling and after treatment with caustic soda and heating to 150–160° C. was washed with water, the final acid treatment being given with sulphuric acid. All figures are given in percentages by weight. The extreme left-hand column of the table shows the reference number to each example.

| Example | $Fe_2O_3$ in sand after washing | $Fe_2O_3$ after oxalate treatment | After sulphuric acid treatment of— | | | | After caustic soda treatment of— | | | |
| | | | Raw sand | | Washed sand | | Raw sand | | Washed sand | |
| | | | Sulphuric acid used | $Fe_2O_3$ | Sulphuric acid used | $Fe_2O_3$ | Caustic soda used | $Fe_2O_3$ | Caustic soda used | $Fe_2O_3$ |
| --- | --- | --- | --- | --- | --- | --- | --- | --- | --- | --- |
| | Per cent | Per cent | Per cent | Per cent | Per cent | Percent | Per cent | Per cent | Per cent | Per cent |
| 1 | 0.087 | 0.034 | 1.0 | 0.018 | | | 1.5 | 0.018 | | |
| 2 | 0.77 | v. high | {4.5, 4.0} | {0.10, 0.092} | 2.0 | 0.11 | {4.5, 3.0} | {0.020, 0.016} | 2.0 | 0.030 |
| 3 | 0.163 | 0.037 | 3.0 | 0.083 | 1.5 | 0.055 | 3.0 | 0.022 | 1.5 | 0.019 |
| 4 | 0.090 | 0.027 | 1.0 | 0.037 | | | 1.5 | 0.020 | | |
| 5 | 0.082 | 0.030 | 1.5 | 0.025 | | | 1.5 | 0.018 | | |
| 6 | 0.088 | 0.048 | 1.5 | 0.040 | 1.0 | 0.040 | 1.5 | 0.028 | {1.0, 1.5} | {0.030, 0.024} |
| 7 | 0.150 | 0.045 | 1.5 | 0.053 | 1.0 | 0.054 | 1.5 | 0.030 | 1.0 | 0.022 |
| 8 | 0.063 | 0.047 | 1.5 | 0.053 | 1.0 | 0.025 | 1.5 | 0.028 | 1.0 | 0.016 |

In the oxalate treatment the sand is treated with an aqueous solution containing 2% of its weight of sodium hydrogen oxalate and 0.25% of its weight of ferrous sulphate crystals in Examples 1 to 5 whilst 1% of the oxalate was used in Examples 6 to 8.

In the sulphuric acid treatment the starting acid used was 98% concentrated, as set out in vertical columns 3, 4, 5 and 6 of the table in the specification.

Raw sand is sand which was not washed with water prior to treatment with caustic soda, the product treated in accordance with the invention being then subjected to tabling prior to assay. Washed sand is sand which has been submitted to washing prior to treatment with caustic soda, the subsequent treatment being the same as for raw sand.

When the same sands were subject to treatment with boiling hydrochloric acid and subsequent removal of heavy minerals, i. e. the most drastic treatment possible without disruption of the grain, the residual iron content (as $Fe_2O_3$) was 0.016–0.018% and the figure was more or less independent of the iron content of the original sand. This must be regarded as a basic value for the kind of sand being treated and it will thus be seen that the treatment described gives approximately the maximum purification in most cases.

Whilst the process has been described with reference to the use of sodium hydroxide it will be understood that the other alkali metal hydroxides, especially those of lithium and potassium may be used but since they are more expensive sodium hydroxide is preferred.

I claim:

1. A process for the purification of sand having a ferruginous coating which comprises wetting the grains of sand with a caustic alkali solution, heating the wetted sand to 150° C. and to substantial dryness and thereafter treating the sand with a dilute mineral acid.

2. A process for the purification of sand having a ferruginous coating which comprises wetting the grains of sand with a caustic soda solution, heating the wetted grains to 150° C. until they are at least substantially dry, washing with water and then with a dilute mineral acid.

3. A cyclic process for the purification of sand having a ferruginous coating which comprises wetting the grains of sand with a caustic soda solution, heating the wetted grains to 150° C. until they are at least substantially dry, washing with water, separating the wash liquor, washing the treated sand with dilute mineral acid, concentrating the wash liquor and using the concentrated wash liquor to treat more sand.

4. A process for the purification of sand having a ferruginous coating which comprises wetting the grains of sand with a caustic soda solution, heating the wetted grains to at least 150° C. until they are at least substantially dry, washing with water and then with dilute sulphuric acid.

HERBERT DAYMOND SEGROVE.

REFERENCES CITED

The following references are of record in the file of this patent:

UNITED STATES PATENTS

| Number | Name | Date |
| --- | --- | --- |
| 1,983,272 | Earle | Dec. 4, 1934 |
| 2,031,969 | McGregor | Feb. 25, 1936 |

FOREIGN PATENTS

| Number | Country | Date |
| --- | --- | --- |
| 505,178 | Great Britain | May 2, 1939 |